(12) United States Patent
Russo et al.

(10) Patent No.: US 7,969,357 B2
(45) Date of Patent: Jun. 28, 2011

(54) SYSTEM FOR ELECTRONICALLY ALIGNING THE POLARIZATION OF AN ANTENNA

(75) Inventors: Pasquale Russo, Rome (IT); Alfredo Catalani, Rome (IT); Franco Di Paolo, Rome (IT); Marzia Migliorelli, Rome (IT)

(73) Assignee: Space Engineering SpA, Rome (IT)

( * ) Notice: Subject to any disclaimer, the term of this patent is extended or adjusted under 35 U.S.C. 154(b) by 120 days.

(21) Appl. No.: 12/052,045

(22) Filed: Mar. 20, 2008

(65) Prior Publication Data
US 2009/0073064 A1    Mar. 19, 2009

(30) Foreign Application Priority Data
Mar. 20, 2007  (IT) .............................. RM2007A0144

(51) Int. Cl.
*H01Q 3/00* (2006.01)

(52) U.S. Cl. .................. 342/361; 342/359; 342/362

(58) Field of Classification Search .................. 342/359, 342/361–362
See application file for complete search history.

(56) References Cited

U.S. PATENT DOCUMENTS

| | | | | |
|---|---|---|---|---|
| 4,241,352 A * | 12/1980 | Alspaugh et al. | ............. | 342/371 |
| 5,151,706 A * | 9/1992 | Roederer et al. | ............. | 342/372 |
| 6,816,114 B1 * | 11/2004 | Moon et al. | .................. | 342/361 |
| 2004/0246174 A1 * | 12/2004 | Lamour et al. | ................ | 342/361 |

OTHER PUBLICATIONS

R.C. Johnson (Editor), Antenna Engineering Handbook, p. 1-4, 1993.*
D. Parker et al., Phased arrays—part 1: theory and architectures, IEEE Transactions on Microwave Theory and Techniques, vol. 50(3), 9. 678-687, 2002.*

* cited by examiner

*Primary Examiner* — Thomas H Tarcza
*Assistant Examiner* — Fred H Mull
(74) *Attorney, Agent, or Firm* — Gauthier & Connors LLP

(57) ABSTRACT

This invention concerns a system (1) for electronically aligning the polarisation of an antenna (2;2*b*) with the polarisation of a signal received therein or transmitted therefrom, said signal having two mutually orthogonal components, namely a vertical component (Cv) and a horizontal component (Co).

14 Claims, 7 Drawing Sheets

SYSTEM FOR ELECTRONICALLY ALIGNING THE POLARIZATION OF AN ANTENNA

PRIORITY INFORMATION

The present application claims benefit from Italian Patent Application No. RM2007A000144, filed on Mar. 20, 2007, all of which is incorporated herein in its entirety.

BACKGROUND OF THE INVENTION

1. Field of the Invention

This invention relates to a system for electronically aligning the polarization of an antenna.

More particularly, this invention relates to a system for electronically aligning the polarization of a receive/transmit antenna to the polarization of a transmit/receive antenna communicating with the former.

As it is well known, the exploitations of computer networks and of the Internet network have been exponentially increasing in recent years. Many people utilize today the Internet network for exchanging data in many different fields of their business or for personal interests.

At present, the exploitation of large band data transmission services based upon use of satellite systems has become a real opportunity which is being extended from an experimental level to an operative condition thereby opening the way to relevant potential both economical and technical applications.

From a technological view point, the antenna represents an essential component. The interest in respect of ground terminals equipped with low cost antennas adapted to receive and to transmit signals from/to different satellites is, therefore, significantly increasing.

The more recent developments are related to technologies aimed at designing flat antennas adapted to operate in full duplex mode and provided both with receive functions and with transmit functions, in view of the fact that they are provided with a common antenna aperture.

A largely utilized antenna type in connection with which the technological research is being very rapidly developed is related to the flat array antenna systems, since they offer various advantages with respect to the reflector antennas commonly utilized today.

An antenna array is realized—as directly suggested by the same definition thereof—by an antenna assembly including a number of identical generally linearly or planar arranged antennas (namely arranged on a line or in a plane), having a common orientation. The individual component elements of these antenna arrays are generally fed with different amplitude and phase.

The main advantage of this technology consists in the possibility to obtain a readily configurable radiation diagram, by varying the amplitudes and the phases of the individual component antennas.

Furthermore, it is possible to design specific arrays aimed at achieving main lobes and their zeroes in desired positions. Among others, also programmable array antennas are known, capable to modify their own radiation diagram by modifying the feed of the individual component antennas of the array.

Antenna of this kind are particularly utilized in space applications where the material displacement of any single antenna or of an antenna array is often a very hard task to be carried out.

The antenna arrays also have among other advantages a compact outline and a more pleasant aesthetic effect. Their implementation in multiple layer construction also adds low manufacturing cost advantages and an easier integration possibility for the antenna electronics.

These characteristics make these antennas particularly attractive for mobile communications.

As it is well known to any person skilled in the art, if the polarization of the antenna of a transmitter and the polarization of the antenna of a receiver are not aligned (namely the horizontal and the vertical components are not aligned), the effectively useful distance for a connection is dramatically reduced. Therefore, it is necessary that the two concerned antennas: (i) always utilize the same polarization type; and (ii) their polarization directions be aligned.

In the technology as presently available, the alignment of the antenna polarization is completely obtained by mechanical azimuth and elevation rotations.

This orientation system, when an antenna array is utilized in the field of data transmission for mobile systems, generates various inaccuracies in the orientation of the antenna and consequently causes phase lags.

Due to this drawback, the presently available antenna arrays have strictly defined utilization limits, particularly for use in the field of DVB (Digital Video Broadcasting) transmissions.

SUMMARY OF THE INVENTION

In the light of the above discussion, it is an object of this invention to propose a system for electronically aligning the polarization of an antenna, preferably of an array type, of an apparatus located on a moving or mobile reference system.

It is specific subject-matter of this invention a system for electronically aligning the polarization of an antenna to the polarization of a signal received therein or transmitted therefrom, said signal having two mutually orthogonal components, namely a vertical component and a horizontal component, said antenna being provided with a first port through which said vertical polarization component is conveyed and with a second port through which said horizontal polarization component is conveyed, characterised in that it comprises:

a polarization reset unit connected to said first port and to said second port of said antenna, including a radio frequency section provided with phase displacement means, amplitude adjustment means and combination means for said vertical and horizontal components of a receive signal; and a control logic unit connected to said polarization reset unit, provided with means for detecting the position of said antenna, by which said logic control unit calculates the lack of alignment between the polarization of said receive signal and the polarization of said antenna and controls said polarization reset unit in order to adjust the combination, phase displacement and amplitude variation operations of said radio frequency section so as to obtain orthogonal components of the signal received in accordance with a polarization aligned to the polarization of said antenna.

According to this invention, said radio frequency section of said polarization reset unit can include a pair of low noise amplifiers, each of which is adapted to amplify a polarization component of said input signal, the signal outputted from each of said low noise amplifiers being conveyed along two separate paths in order to pass through a phase displacement device and an attenuation or amplification device, serially connected with one another, the so obtained signals being summed to one another by means of combination devices.

Again according to this invention, said polarization reset unit can be provided with a pair of output ports having a pair of down-converters connected thereto, respectively.

Further according to this invention, said polarization reset unit can be connected to said logic control unit by means of a digital section adapted to adjust the combination, phase displacement and amplitude variation operations of said radio frequency section.

Again according to this invention, said antenna is adapted to transmit a signal comprising a vertical component and a horizontal component that are mutually orthogonal and have the equal or different amplitudes, according to a transmit polarization, and the system can also include a polarization correction unit which receives an input signal having a vertical component and a horizontal component that are mutually orthogonal, said polarization correction unit being connected to said first port and to said second port of said antenna into which it injects the components of the transmit signal, said system also including a second radio frequency section provided with phase displacement means, amplitude adjustment means and with means for separating the vertical and horizontal components of said input signal, said logic control unit being connected to said polarization correction unit and being adapted, based upon the position detected by said position detection means of said antenna, to calculate the lack of alignment of the polarization of said transmitted signal with respect to the polarization of said antenna as well as to control said polarization correction unit in such a way as to adjust the combination, phase displacement and amplitude variation operations of said second radio frequency section in order to transmit the vertical component and the horizontal component of the transmit signal according to said transmit polarization.

Again according to this invention, said polarization correction section can include a separation device for separating the polarization components of the signal to be transmitted, adapted to convey said polarization components along two different paths each including a displacement device, one or more serially connected attenuation or amplification devices and a low noise amplifier, before said components reach the ports of said antenna.

Further in accordance to this invention, said polarization correction unit can be provided with an input port having a frequency up-converter connected thereto.

Again according to this invention, said polarization correction unit can be connected to said logic control unit by means of a digital section adapted to adjust the combination, phase displacement and amplitude variation operations of said second radio frequency section.

Again according to this invention, the concerned system can include a first radio frequency combination device operating as a diplexer, having a first common port and a pair of first output ports, said first common port being connected to said first port of said antenna, one of said first output ports being connected to an output port of said polarization correction unit and the other output port being connected to an input port of said polarization reset unit; and a second radio frequency combination device operating as a diplexer, having a second common port and a pair of second output ports, said second common port being connected to said second port of said antenna, one of said second output ports being connected to an output port of said polarization correction unit and the other output port being connected to an input port of said polarization reset unit.

Further in accordance with this invention, said logic control unit can include processing means, connected to said position detecting means, adapted to process the data detected by them;

interface means connected to said processing means, adapted to allow the system to be controlled by an operator; and data storage means, connected to said processing means and adapted to support their processing operations.

According to this invention, the system is adapted to manage linear polarization alignment operations based upon at least a first setting signal provided by said interface means. By these means, for instance, it is also possible to "manually" set the orientation direction at which the concerned system should receive and/or transmit, such system having therefore a capability to manage linear polarization alignments based upon external inputs.

Again according to this invention, the system is adapted to receive circular polarization signals, possibly two simultaneous circular polarization signals, based upon a second setting signal provided by said interface means. By these means, for instance, it is also possible to receive circular polarization signals (for instance according to American standards), by simply automatically and suitably setting the phase displacements introduced by said polarization reset unit.

Further in accordance with this invention, the system is adapted to transmit circular polarization signals, possibly two simultaneous circular polarization signals, based upon at least a third setting signal provided by said interface means. Also in this case, by these means, for instance, it is also possible to receive circular polarization signals (for instance according to American standards), by simply automatically and suitably setting the phase displacements introduced by said polarization correction unit.

According to this invention, said position detecting means can include a GPS receiver adapted to detect the spatial position of said antenna.

Again in accordance with this invention, said position detecting means can include a gyroscope adapted to detect the trim of said antenna.

Further according to this invention, said antenna can be of an antenna array type.

According to this invention, said antenna array can utilize radiating elements of horn type.

BRIEF DESCRIPTION OF THE DRAWINGS

This invention will be now described by way of illustration not by way of limitation according to its preferred embodiments, by particularly referring to the Figures of the annexed drawings, in which.

DETAILED DESCRIPTION OF THE INVENTION

Figure 1:
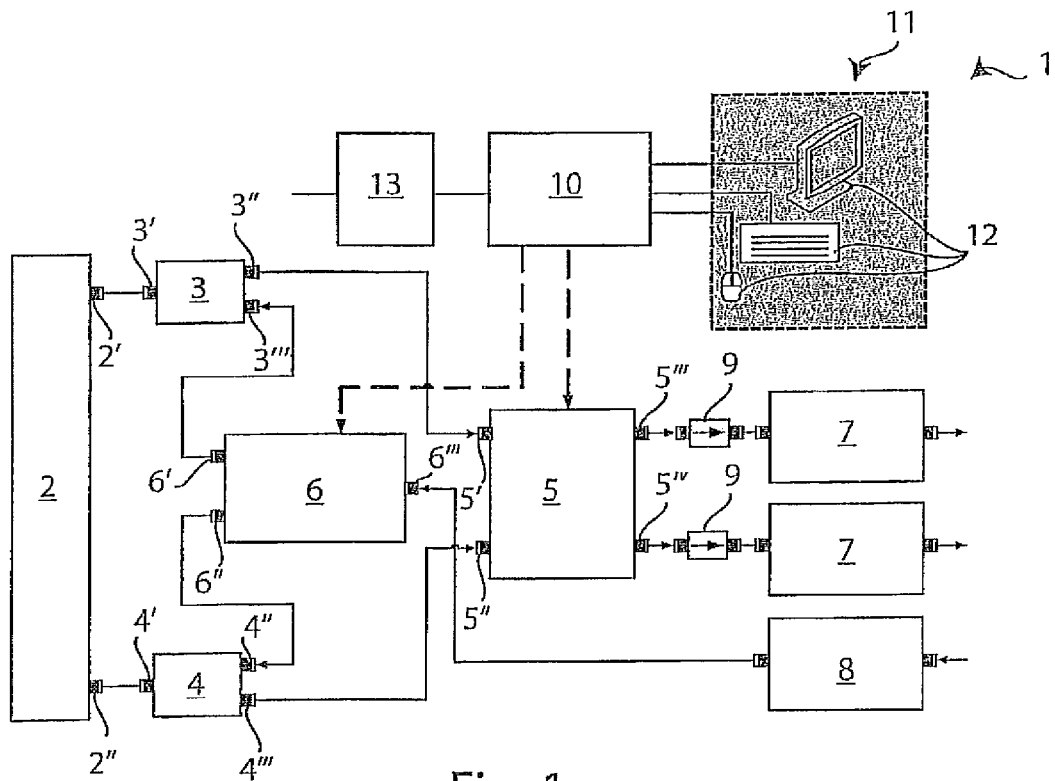
FIG. 1 shows a block diagram in transmission and reception modes of the system for electronic alignment of the polarization of an antenna according to this invention.

By referring now to FIG. 1, it is possible to observe a block diagram of the preferred embodiment of a system 1 for electronic orientation of an antenna 2 according to this invention.

Antenna 2 includes a first port 2' and a second port 2", in which the horizontal and vertical polarization signals are conveyed in connection with the signal received by or transmitted to antenna 2.

Both ports 2' and 2" properly operate on the whole transmit and receive pass band and, more precisely, in a preferred embodiment, for receiving and transmitting satellite signals:
for the receive band, the frequency is in the range of 10.7 to 12.75 GHertz, Kurz-Under-Band (also known with the abbreviation Ku-band); and
for the transmit band, the frequency is in the range of 14.00 to 14.50 GHertz, Kurz-Under-Band.

Each port 2' and 2" is connected to a diplexer 3 and 4, namely to a radio frequency combination device. Said diplexers 3 and 4 are independent from one another, they are optimized and adapted to separate or to combine the transmit and receive paths of the signals of said antenna 2.

Possibly, antenna 2 can also be designed such that said diplexers 3 and 4 are already incorporated in a beam forming network. This could enable the performances, the cost and the overall dimensions of the same antenna 2 to be optimized.

Each of said diplexers 3 and 4 is provided with a common port 3' and 4' as well as with a port pair 3", 4" and 3''', 4''', for the transmit and receive signals, respectively.

As it is well known, a diplexer is a device adapted to combine two signals coupled to its two input ports so as to obtain a single signal detectable at its output port. It should be considered that a diplexer is generally a two-directional device, so that, by changing the operation conditions, it is also possible to divide a signal coupled to its output port into two signal with different carriers, detectable at its input ports.

Each diplexer 3 and 4 has a port 3" and 4''', respectively, connected to a polarization reset unit 5.

The receive signal available on common output port 3' or 4' of each diplexer 3 or 4 is coupled to the input ports 5', 5" of said polarization reset unit 5, while the transmit signal comes from a polarization correcting unit 6, whose output ports 6' and 6" are connected to the input ports 3" and 4" for the signal transmitted by diplexers 3 and 4.

The output signals from the polarization reset unit 5 are subsequently converted by a pair of frequency down-converters 7 connected to said output ports 5''' and 5$^{iv}$ of unit 5 by means of transmission lines 9 and therefore they are available for use for instance by DVB (Digital Video Broadcasting) communication systems. Said converters 7 convert the frequency of an input radio frequency signal to an intermediate frequency or to a base band frequency.

Input port 6''' of the polarization correction unit 6 is connected to the output of a frequency converter 8, namely an up-converter, and receives the output signal therefrom for transmission. Said frequency converter 8 converts an intermediate frequency (IF) or base band signal to a radio frequency signal.

Furthermore, said system 1 includes a control logic unit 10 provided with interface means 11, which comprise, in the illustrated embodiment, a personal computer 12. Personal computer 12 enables an operator to control the operation functions of system 1.

System 1 is adapted to align the linear polarization of signal (e.g. from/to satellite)/antenna, both in receive and in transmit modes. The operation will be briefly described herein below.

The signal received from antenna 2 reaches the input of the polarization reset unit 5 through diplexers 3 and 4. Said polarization reset unit 5 is adapted to process both the vertical and the horizontal polarization components of the signal received from a transmitter, e.g. a satellite, regardless of the lacking mechanical alignment of the polarization of the receive antenna 2. Therefore, said polarization reset unit 5 electronically re-aligns the polarization axes of antenna 2, in receiving mode, to the polarization axes of the signal transmitter, which generally will be a satellite.

The operation of system 1 in transmit mode is substantially similar.

A signal reaching converter 8 (up-converter) is injected into polarization correction unit 6. Said polarization correction unit 6 is capable to supply the two input ports of antenna 2 with signals of different power levels. Antenna 2 is adapted in this way to radiate even a single linear polarization with the desired polarization angle.

Logic control unit 10 is designed to assure a correct adjustment both to the polarization correction 6 and to the polarization reset unit 5.

Lastly, the direct current power supply means 13 provide for stabilized power supply to all of the electronic devices of the concerned system.

The components of system 1 will be described herein below, by more specifically clarifying their operation.

Polarization Reset Unit

Figure 2:
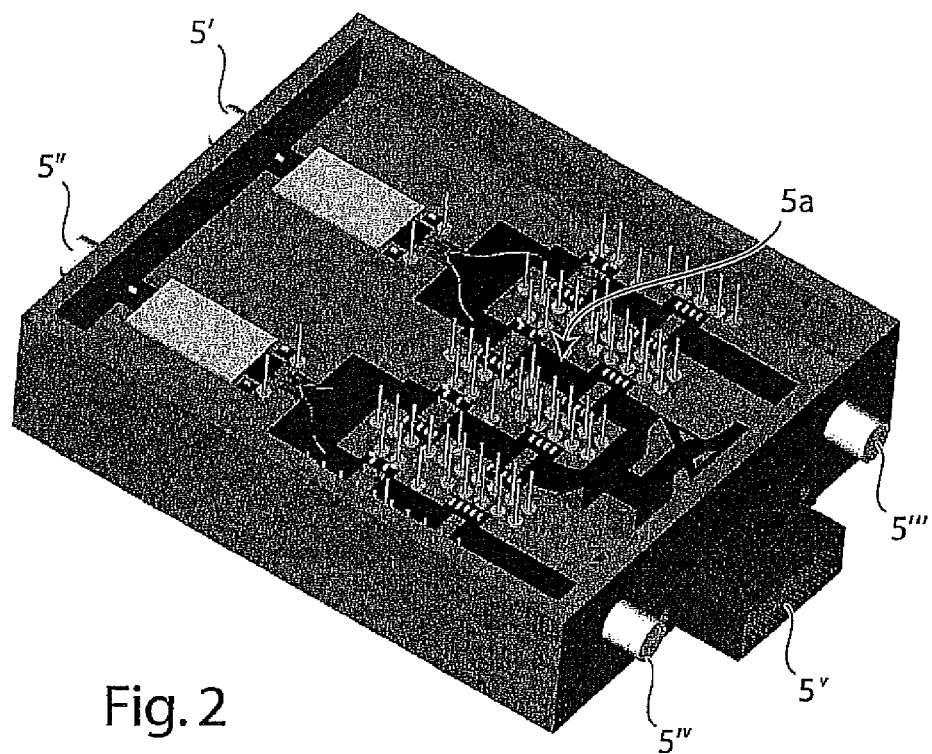
FIG. 2 shows a top perspective view of a receive unit for resetting the polarization of the system according to this invention.
Figure 3:
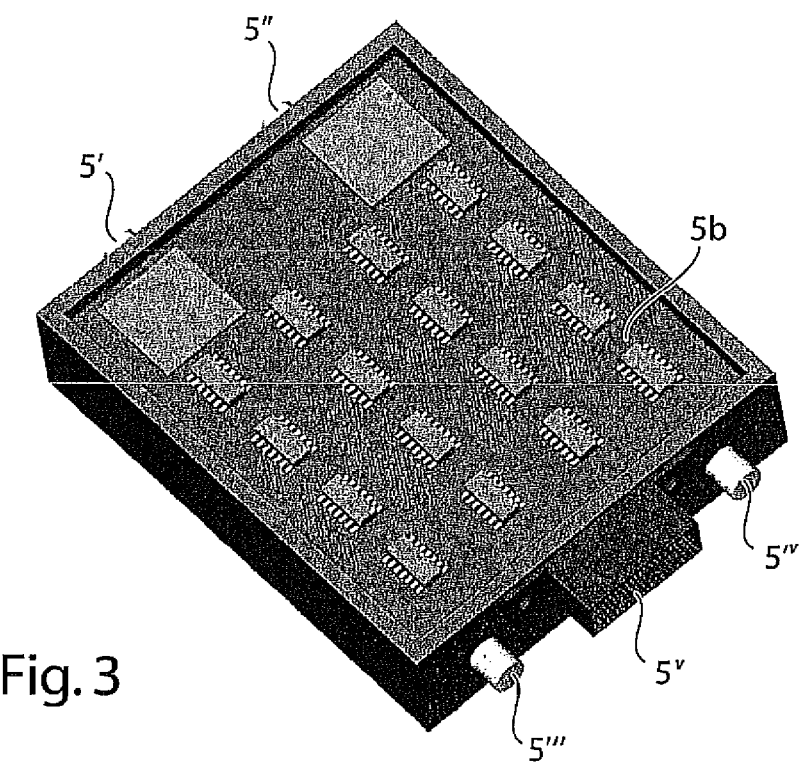
FIG. 3 shows a bottom perspective view of the receive unit for resetting the polarization of the system according to FIG. 1.

By referring to FIGS. 2 and 3, it is possible to observe an embodiment of this polarization reset unit 5.

Said polarization reset or recovery unit 5 comprises two sections: a radio frequency section 5a (FIG. 2) and a digital section 5b (FIG. 3), in reciprocal communication by means of feed-through connections.

Radio frequency section 5a is connected to said ports 5', 5", 5''' and 5$^{iv}$, while digital section 5b includes a signal connector 5v that can be implemented in various technologies, preferably as a video connector.

Figure 4:
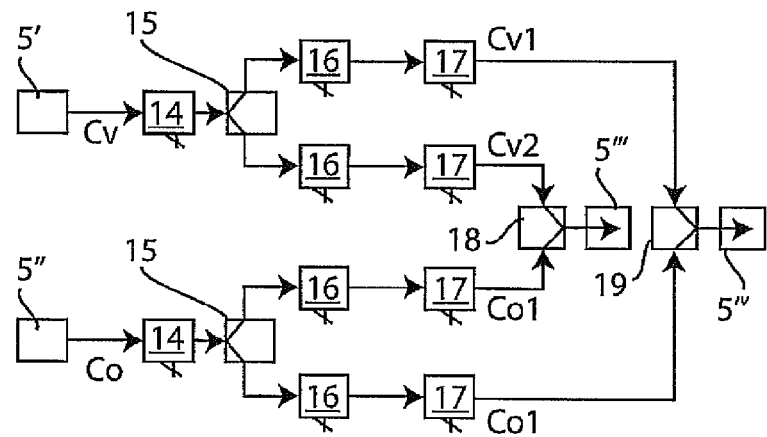
FIG. 4 shows a function block diagram of the unit for resetting the polarization of the system according to FIG. 1.

The operation of said radio frequency section 5a is described by referring to FIG. 4. Port 5' receives the vertical component Cvr of the receive signal coming from antenna 2, while port 5" receives the horizontal component Cor.

Said signals Cvr and Cor upon being received through ports 2' and 2" are amplified by means of low noise amplifiers (LNA) 14. Said signals Cvr and Cor are subsequently divided by respective diplexers 15 into two different paths, in which they are processed in order to obtain signals Cvr1, Cvr2 and Cor1, Cor2.

The above said four components Cvr1, Cvr2 and Cor1, Cor2 in effect are obtained by means of a process including amplification and/or attenuation and/or phase displacement operations.

In particular, by carefully referring to FIG. 4, it can be clearly observed that the above said components Cvr1, Cvr2 and Cor1, Cor2 of the signal (as amplified by low noise amplifiers 14) are obtained at the outputs of said diplexers 15, in the above mentioned four paths, upon passage of components Cvr and Cor through two different paths each of which includes a phase displacement device 16 and an amplifier device 17.

Two combination units 18 and 19 subsequently combine components Cvr1-Cor2 and Cvr2-Cor1 as obtained from said four paths, suitably amplified and/or attenuated and/or phase displaced. In other words, a linear combination of said components Cvr1, Cvr2 and Cor1, Cor2 is performed.

In particular, FIG. 4 illustrates two orthogonal linear polarizations simultaneously received in a satellite.

The signals obtained at the outputs of said combination units 18 and 19 are then conveyed to converters 7 through ports 5''' and 5$^{iv}$.

Digital section 5b will be hereinafter analysed. Digital section 5b is connected to said control logic unit 10 and receives input commands therefrom to arrange for the process steps carried out by radio frequency section 5a, in order to control, by means of said feed-through-connections, the phase displacements and/or the amplifications and/or the attenuation to be applied to components Cvr and Cor of the input signal routed along the above mentioned four paths.

Digital section 5b includes a connector 5v, preferably a video connector, more preferably a DB-15 type connector, as well as further components needed for processing the video signals, such as drivers, voltage regulators, logic devices.

The connections for ports 5', 5'', 5''' and 5$^{iv}$ are preferably implemented by means of SMA connectors.

Said polarization recovery unit 5 preferably has the following technical operation characteristics:
  operation pass band: 10.70 to 12.75 GHz, Kurtz-under-band;
  noise figure : 0.9 dB;
  power supply: +5/−5 V at 90 mA;
  phase control : 5 bits per 360°,
  amplitude control : 5 bits per 25 dB attenuation;
    gain: 10 dB±2 dB at 0 dB;
    radio frequency connectors: SMA;
    video connectors : DB15.

Polarization Correction Unit

Figure 5:
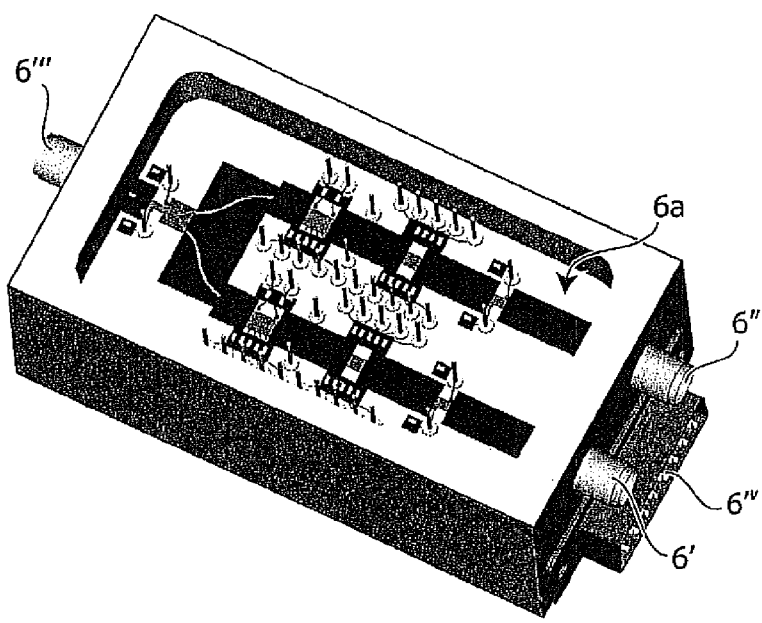
FIG. 5 shows a top perspective view of a transmit unit for correcting the polarization of the system according to FIG. 1.
Figure 6:
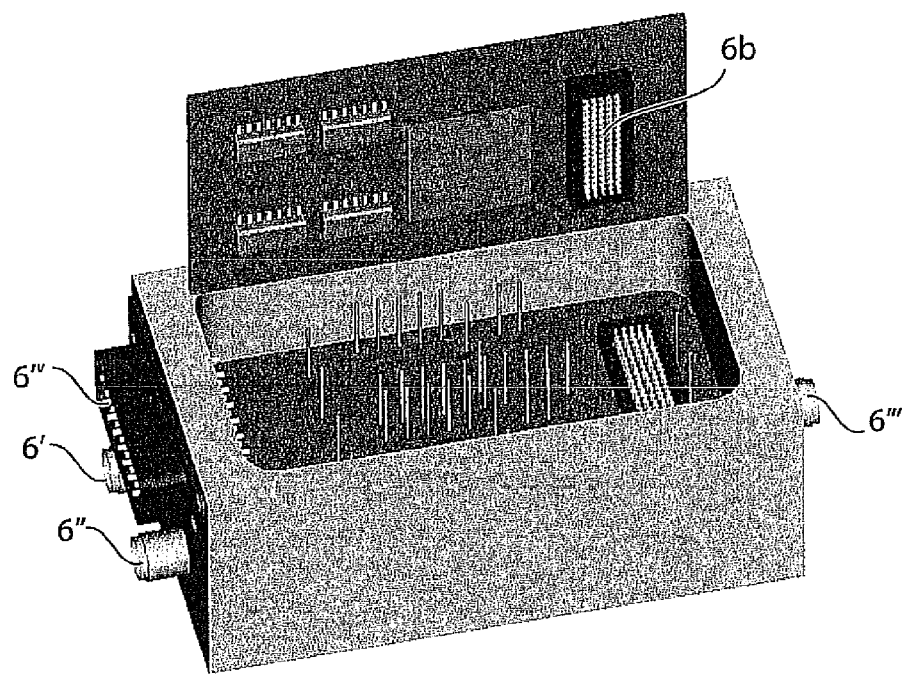
FIG. 6 shows a bottom perspective view of the transmit unit for correcting the polarization of the system according to FIG. 1.

By referring now to FIGS. 5 and 6, it is possible to observe an embodiment of the concerned polarization correction unit 6.

Said polarization correction unit 6 also in this case comprises two sections: a radio frequency section 6a (FIG. 5) and a digital section 6b (FIG. 6), in reciprocal communication by means of feed-through connections.

Said polarization correction unit 6 has an operation mode substantially similar to the operation mode of said polarization recovery unit 5.

Figure 7:
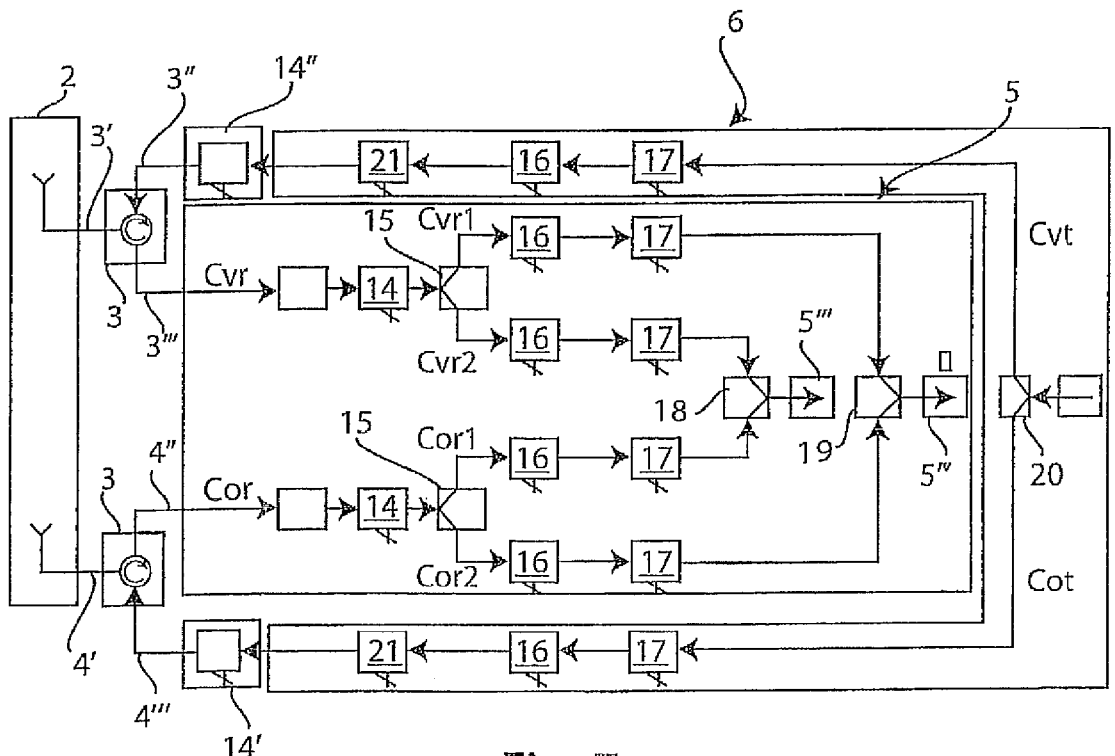
FIG. 7 shows a function block diagram of the unit for resetting the polarization and of the receive and transmit unit for correcting the polarization of the system according to FIG. 1.

In particular, by referring now to FIG. 7, a general block diagram of the operation of the preferred embodiment of system 1, including both unit 5 and unit 6, is illustrated.

Radio frequency 6a of said polarization correction 6 includes a diplexer 20 into which a signal coming from converter 8 is injected.

The transmit signal is divided into two portions by diplexer 20 operating as a divider; said two signal portions are the vertical and horizontal polarization components, respectively designated as Cvt and Cot. Said signals Cvt and Cot are amplified and/or attenuated and/or phase displaced by means of amplification/attenuation devices 17 and 21 and by means of a phase displacing device 16.

Each of said signals Cvt and Cot is subsequently conveyed to said antenna 2 through said diplexers 3 and 4.

Digital section 6b of said polarization correction unit 6 is connected to said control logic unit 10 and receives input commands therefrom to arrange for the process steps carried out by radio frequency section 6a, in order to control, by means of said feed-through-connections, the phase displacements and/or the amplifications and/or the attenuation to be applied to components Cvt and Cot of the signal to be transmitted. In particular, digital section 6b of said polarization correction unit 6 is connected to said control logic unit 10 by means of a connector 6', preferably of video type and more preferably of DB15 type.

The technical general characteristics of the polarization correction unit 6, in a preferred embodiment, are hereinafter set forth:
  operation pass band: 14.0 to 14.5 GHz;
  power supply: +7 V at 4.5 A; +5/−5 V at 50 mA;
  phase control : 5 bits per 360°,
  amplitude control : 5 bits per 25 dB attenuation;
  gain : 55 dB±2 dB at 0 dB;
  radio frequency connectors: SMA;
    video connectors: DB15.

Figure 8:
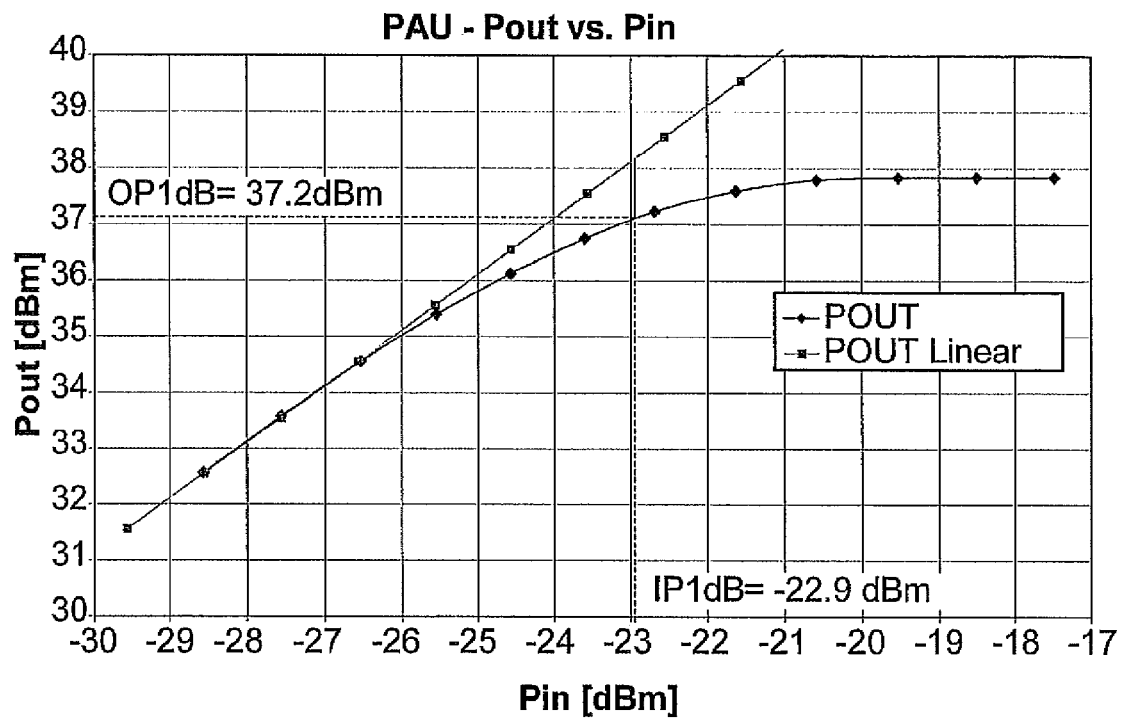
FIG. 8 shows a graph illustrating the Bode diagram of the ratio between the input power and the output power of the unit for correcting the polarization.

FIG. 8 shows a graph illustrating the Bode diagram of the ratio between the input power and the output power of the polarization correction unit 6.

Due to the large dissipated amount of radio frequency power, the polarization correction unit 6 is provided with a heat dissipator (heat sink) (not shown in the Figures) which enables the temperature to be lowered.

Figure 9:
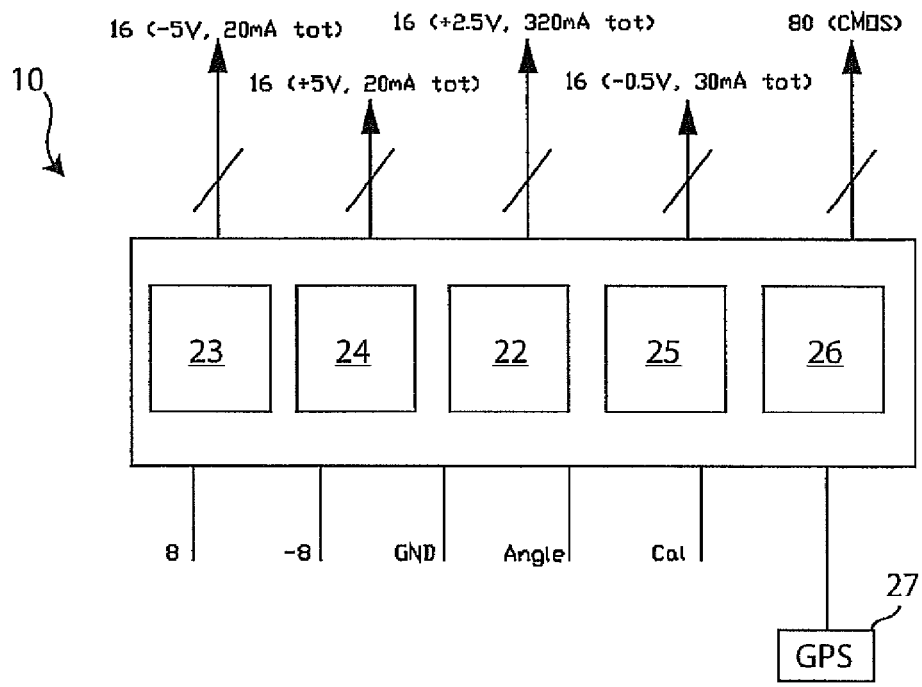
FIG. 9 shows a block diagram of the control logic unit of the system according to FIG. 1.

By referring to FIG. 9, logic control unit 10 includes a microprocessor 22, an information storage section, comprising a random access memory (RAM) 23 and a flash memory 24. Furthermore, said logic control unit 10 includes a voltage regulator 25 and a control section 26 connectable to localization means 27 comprising an external GPS and possibly a gyroscope device as well (not shown in the Figure), adapted to detect the orientation of antenna 2 of system 1 with respect to the external transmit/receive antenna from which it receives or to which it transmits the signals.

Said logic control unit 10 is adapted to be interfaced to phase displacement devices 16 and to amplifiers 17, that are monolithic microwave integrated circuit (MMIC) devices, of radio frequency section 5a for control thereof.

Said control logic unit 10 is implemented with MMIC type components, as well.

The main functions of said logic control unit 10 are as follows:
  governing and controlling both the polarization reset unit 5 and the polarization correction unit 6;
  effecting a polarization calibration of antenna 2;
  detecting the orientation of antenna 2 (or of the reference system onto which the logic control unit as well as antenna 2 are installed) with respect to the source/receiver of the received/transmitted signal.

Let us consider now the transmit operation: said logic control unit 10 is capable to detect the lack of alignment between the orthogonal reference axes of antenna 2 with respect to the reference axes of the plane incident wave, by said localization and positioning means 27.

Based on such information, said logic control unit 10 is capable to calculate the in-phase and the quadrature vertical and horizontal polarization components Cvr and Cor aligned to those of the receive antenna (namely the satellite one) and consequently it is adapted to calculate the attenuation or the phase displacement they are going to be subjected to. In this way, said logic control unit 10 sends the results of its calculation operation to digital section 5b of said polarization reset unit 5, which drives the phase displacement devices 16 and the amplifier devices 17 as well as the diplexers 18 and 19 in order that the aligned vertical and horizontal polarization components be obtained therefrom.

Figure 10:
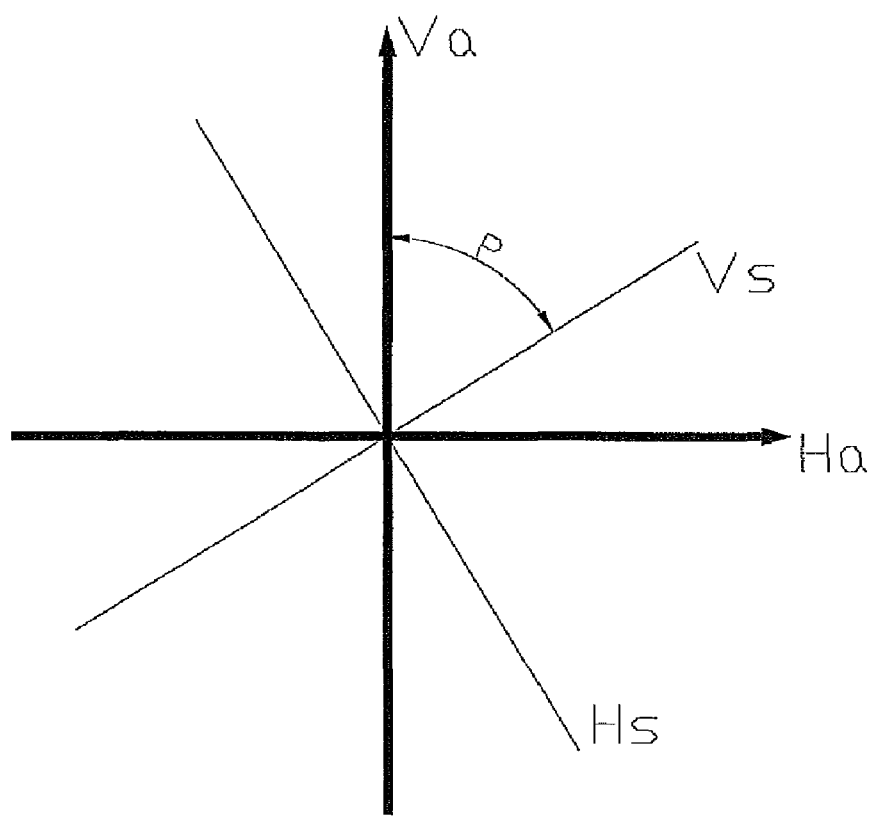
FIG. 10 schematically shows the geometry of an antenna polarization and of a polarization, out of alignment to the former, of a signal received or transmitted therefrom.

By referring to FIG. 10 and aiming at exemplifying all above discussion from a mathematical view point, let us designate the horizontal and vertical polarization axes of antenna 2 as $H_a$ and $P_a$, respectively, and the horizontal and vertical polarization axes of the incident wave as $H_s$ and $V_s$, respectively, and assuming that the two orthogonal reference systems are rotated by an angle p, it can be concluded that the components of the incident field in the reference system of the receive antenna are:

$$Va = V_s \cos(p) - H_s \sin(p)$$

$$Ha = V_s \sin(p) + H_s \cos(p)$$

Let us consider a linear combination of $V_a$ and $H_a$ by utilizing two unknown complex multipliers A and B. It turns out to be:

$$AV_a+BH_a=A\ (V_s\cos(p)-H_s\sin(p))+B\ (V_s\sin(p)+H_s\cos(p))=(A\cos(p)+B\sin(p))\ V_s-(A\sin(p)-B\cos(p))\ H_s$$

When it is desired to extract component $V_s$, the following conditions should be fulfilled:

$$A\cos(p)+B\sin(p)=1$$

$$A\sin(p)-B\cos(p)=0.$$

The equation system is fulfilled when:

$$A=\cos(p)\ \text{and}\ B=\sin(p).$$

Similarly, when it desired to extract component $H_s$, the following conditions should be fulfilled:

$$A\cos(p)+B\sin(p)=0$$

$$A\sin(p)-B\cos(p)=-1.$$

The above equation system is fulfilled when:

$$A=-\sin(p)\ \text{and}\ B=\cos(p).$$

A careful control of the phase displacement devices and of the attenuation devices in polarization reset unit 5 as well as in polarization correction unit 6 enables us to obtain a correct recovery of the polarization.

The functions of the above said phase displacement devices and attenuation devices are carried out by devices 16 and 17 of the radio frequency sections 5a and 6a, that are controlled by said logic control unit 10.

The above simple example (that assumes a relationship between the two-component vectors $H_s$, $P_a$ and $H_s$, $V_s$ with a subsequently diagonalized 2×2 matrix) indicates that the linear combination of the polarization components of the signal effectively re-aligns the antenna/signal polarization. In conclusion, it is possible to carry out different calculations according to the most convenient combination of the signal components, in order to obtain the desired polarization.

The constructions of the radio frequency sections 5a and 6a allow us to realize different combinations of said components, in order to allow us to obtain the electronic alignment of the polarization for any condition and any orientation of antenna 2.

Figure 11:
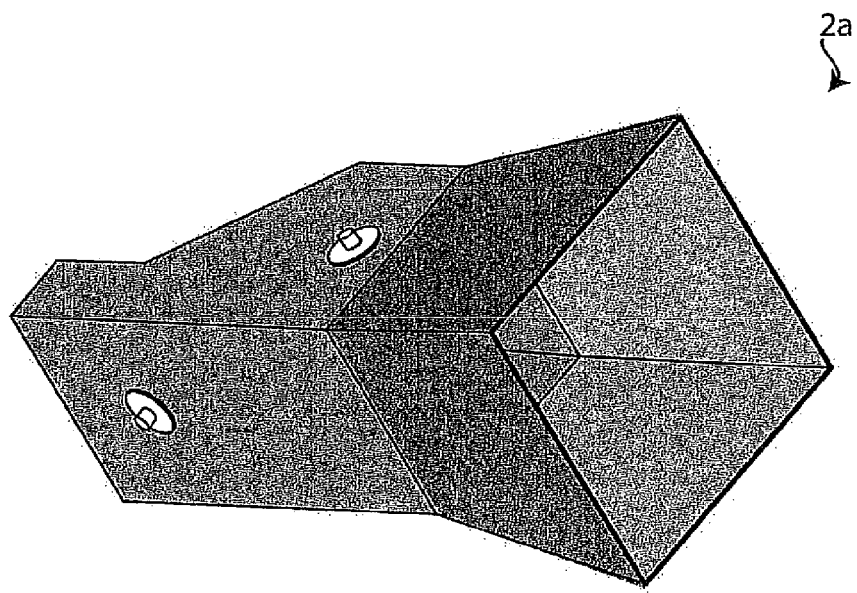
FIG. 11 shows a first embodiment of a radiating element of the antenna in which the system according to this invention is embodied.

By referring now to FIG. 11, it is possible to observe the preferred embodiment of a radiating element that can be utilized in the concerned system 1 for electronic alignment of the polarization according to this invention.

Figure 12:
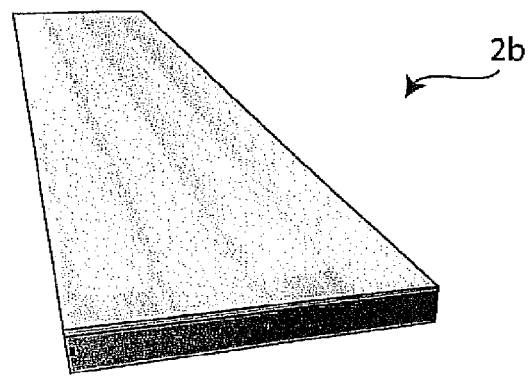
FIG. 12 shows a second embodiment of an array antenna in which the system according to this invention is embodied.
Figure 13:
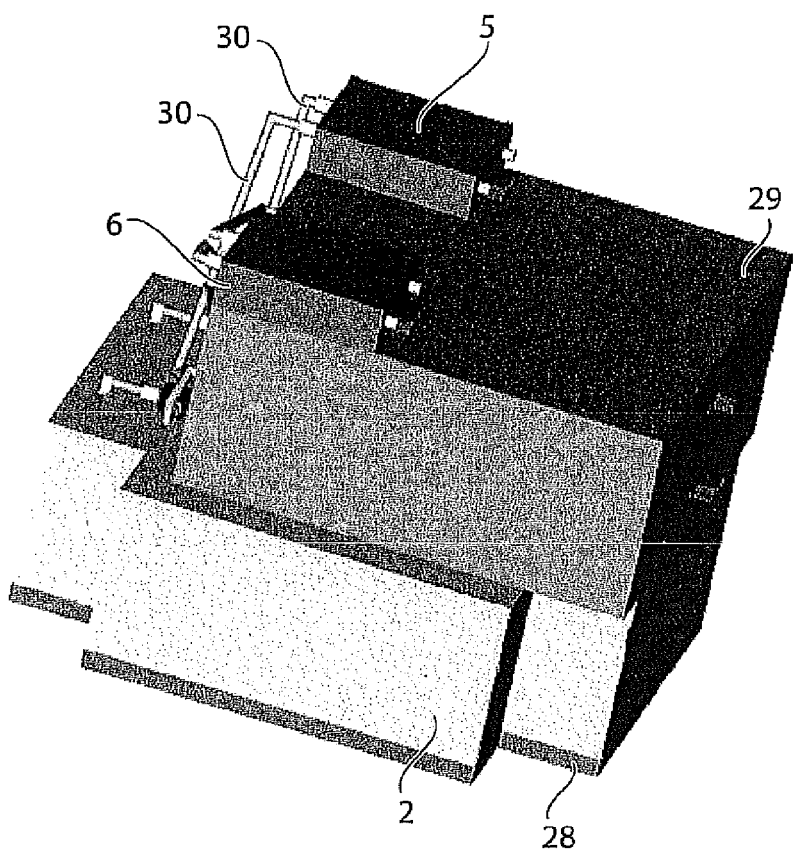
FIG. 13 shows an implementation of the system according to this invention.

FIG. 12 illustrates an array antenna comprising a number of radiating horn elements. This array antenna has been developed for operation in Ku band.

Array antenna 2b is comprised of a plurality of antenna elements (not shown in the Figure), whose vertical and horizontal polarization components are combined with one another by means of internal diplexers.

This array antenna 2b is of low loss type and it is utilized in the preferred embodiment for video signal reception.

In particular, said antenna 2b is noticeably compact, as it has an overall thickness of 70 millimeters.

The peak gain of the antenna is of approximately 31.5 dBi in the reception band and of 32.5 dBi in the transmission band. The ohmic losses of antenna 2" are in the range of 0.3 dB.

The polar diagram of said antenna has suitable lateral lobes adapted to fulfill the standards for DVB satellite communications (e.g. ETSI).

Lastly, FIG. 3 shows a possible implementation of system 1 for electronically aligning the polarization of an antenna 2.

In particular, it can be observed that antenna 2 is protected by its own radome 28 and is installed upon a base construction 29. Polarization reset unit 5 and polarization correction unit 6 are also mounted on said base construction and are connected to antenna 2 by means of transmission lines 30.

It can be remarked that the resulting system 1 is very compact and no mechanical means are required for rotation thereof.

On the grounds of the preceding discussion, it can be observed that the substantial characteristic of the present invention provides for the possibility to have two simultaneous receive orthogonal (linear or circular) polarizations and one transmit (linear or circular) polarization. In order to optimize the overall radio frequency connection properties, the antenna system as developed in accordance with this invention is capable to maximize the radio frequency signal available at the output port of linear polarization with the incoming signals.

In transmit mode, an antenna according to this invention is adapted to transmit a linear angled polarization aligned to the orientation of the linear polarization of the receiving system.

The present invention has been described by way of illustration and not by way of limitation in its preferred embodiments, but it should be understood that variations and/or modifications can be made by persons skilled in the art, without so departing from the protection scope thereof, as defined by the following claims.

We claim:

1. A system for electronically aligning the polarization of an antenna to the polarization of a signal received therein or transmitted therefrom, said signal having two mutually orthogonal components, namely a vertical component and a horizontal component, said antenna being provided with a first port through which said vertical polarization component is conveyed and with a second port through which said horizontal polarization component is conveyed, wherein the system comprises:

a polarization recovery unit connected to said first port and to said second port of said antenna, said polarization recovery unit including a first port connected with said first port of said antenna for receiving the vertical component of the received signal from the antenna, and a second port connected with said second port of said antenna for receiving the horizontal component of the received signal from the antenna, wherein said polarization reset unit includes:

a radio frequency section provided for each of said vertical and horizontal components (Cvr and Cor) of said signal, said radio frequency section including:

a low noise amplifier for attenuating or amplifying each of said vertical and horizontal components of said signal;

a diplexer for dividing each of said vertical component (Cvr) and said horizontal component (Cor) of said signal into respectively first and second vertical signals (Cvr1 and Cvr2) along first and second vertical signal paths, and first and second horizontal signal paths (Cor1 and Cor2) along first and second horizontal signal paths, each path further comprising a phase displacement device and a path amplifier/attenuator device, for attenuating the divided signal of each path;

a first combination unit for combining a signal from the second vertical signal path with a signal from the first horizontal signal path; and a second combiner unit for combining a signal from the first vertical signal path with a signal from the second horizontal signal path;

wherein said polarization reset unit further includes a pair of output ports, each of which is coupled to one of a pair of downconverters; and a control logic unit connected to said polarization reset unit that detects the position of said antenna, by which said logic control unit calculates the lack of alignment between the polarization of said receive signal and the polarization of said antenna and controls said polarization reset unit in order to adjust the combination, phase displacement and amplitude variation operations of said radio frequency so as to obtain orthogonal components of the signal received in accordance with a polarization aligned to the-polarization of said antenna.

2. A system according to claim 1, wherein said polarization reset unit is connected to said logic control unit to adjust the combination, phase displacement and amplitude variation operations of said radio frequency section.

3. A system according to claim 1, wherein said antenna is adapted to transmit a signal comprising a vertical component and a horizontal component that are mutually orthogonal according to a transmit polarization, and in that the system also includes an polarization correction unit which receives an input signal having a vertical component (Cvt) and a horizontal component (Cot) that are mutually orthogonal, said polarization correction unit being connected to said first port and to said second port of said antenna into which it injects the components of the transmit signal, said system also including a second radio frequency section provided with a diplexer for dividing said signal into said transmission vertical component (Cvt) and said transmission horizontal component (Cor) of the transmitting signal into respectively a first vertical transmission signal path and a second horizontal transmission path, each of the first vertical transmission signal path and the second horizontal transmission path further comprising:

a phase displacement device and an amplifier/attenuator device for attenuating or amplifying a vertical transmission signal in the vertical transmission signal path and a horizontal transmission signal in the second horizontal transmission signal path respectively; and a low noise amplifier;

said logic control unit being connected to said polarization correction unit and being adapted, based upon the position detected by said position detection devices of said antenna, to calculate the lack of alignment of the polarization of said transmitted signal with respect to the polarization of said antenna as well as to control said polarization correction unit in such a way as to adjust the combination, phase displacement and amplitude variation operations of said second radio frequency section in order to transmit the vertical component and the horizontal component of the transmit signal according to said transmit polarization.

4. A system according to claim 3, wherein said polarization correction unit is provided with an input port having a frequency up-converter connected thereto.

5. A system according to claim 3, wherein said polarization correction unit is connected to said logic control unit via a second digital section adapted to adjust the combination, phase displacement and amplitude variation operations of said second radio frequency section.

6. A system according to claim 3, wherein it includes a first radio frequency combination device operating as a diplexer, having a first common port and a pair of first output ports, said first common port being connected to said first port of said antenna, one of said first output ports being connected to an output port of said polarization correction unit and the other output port being connected to an input port of said polarization reset unit; and a second radio frequency combination device operating as a diplexer, having a second common port and a pair of second output ports, said second common port being connected to said second port of said antenna, one of said second output ports being connected to an output port of said polarization correction unit and the other output port being connected to an input port of said-polarization reset unit.

7. A system according to claim 1, wherein said logic control unit includes processing unit adapted to process the data detected;

interface unit adapted to allow the system to be controlled by an operator; and data storage unit adapted to support their processing operations.

8. A system according to claim 7, wherein the system is adapted to manage linear polarization alignment operations based upon at least a first setting signal provided by said interface unit.

9. A system according to claim 7, wherein the system is adapted to receive two simultaneous circular polarization signals, based upon a second setting signal provided by said interface unit.

10. A system according to claim 7, wherein the system is adapted to transmit two simultaneous circular polarization signals, based upon at least a third setting signal provided by said interface unit.

11. A system according to claim 1, wherein said control logic unit include a GPS receiver adapted to detect the spatial position of said antenna.

12. A system according to claim 1, wherein said control logic unit include a gyroscope adapted to detect the trim of said antenna.

13. A system according to claim 1, wherein said antenna is an antenna array.

14. A system according to claim 13, wherein said antenna array utilizes horn type radiating elements.

* * * * *